US012305563B2

(12) United States Patent
Kurt et al.

(10) Patent No.: US 12,305,563 B2
(45) Date of Patent: May 20, 2025

(54) CRANKCASE WITH INNER AND OUTER COOLANT JACKET

(71) Applicants: DEUTZ Aktiengesellschaft, Cologne (DE); Deere & Company, Moline, IL (US)

(72) Inventors: Tobias Kurt, Dormagen (DE); Marco Sliwa, Siegburg (DE)

(73) Assignees: DEUTZ Aktiengesellschaft, Cologne (DE); Deere & Company, Moline, IL (US)

( * ) Notice: Subject to any disclaimer, the term of this patent is extended or adjusted under 35 U.S.C. 154(b) by 0 days.

(21) Appl. No.: 18/437,075

(22) Filed: Feb. 8, 2024

(65) Prior Publication Data

US 2024/0271557 A1 Aug. 15, 2024

(30) Foreign Application Priority Data

Feb. 9, 2023 (DE) ......................... 102023000401.4

(51) Int. Cl.
*F01P 3/12* (2006.01)
*F02F 7/00* (2006.01)
*F02F 11/00* (2006.01)

(52) U.S. Cl.
CPC .............. *F01P 3/12* (2013.01); *F02F 7/0021* (2013.01); *F02F 11/002* (2013.01)

(58) Field of Classification Search
CPC ........... F01P 3/12; F02F 7/0021; F02F 11/002
See application file for complete search history.

(56) References Cited

U.S. PATENT DOCUMENTS

| | | | | |
|---|---|---|---|---|
| 8,820,273 B2 * | 9/2014 | Kashiwa | F01P 11/0276 | 123/41.78 |
| 2005/0151328 A1 * | 7/2005 | Sugano | F16J 10/04 | 277/595 |
| 2009/0049807 A1 * | 2/2009 | Stemmer | F01M 13/04 | 55/290 |
| 2009/0126660 A1 * | 5/2009 | Kashiwa | F01P 11/0276 | 123/193.2 |
| 2021/0148304 A1 * | 5/2021 | Kumar | F01P 3/02 | |

FOREIGN PATENT DOCUMENTS

| | | | | | |
|---|---|---|---|---|---|
| DE | 10241478 | A1 | | 3/2004 | |
| EP | 0457051 | A1 | | 11/1991 | |
| JP | 2007077852 | A | * | 3/2007 | F02F 7/0053 |
| WO | WO-2007144743 | A1 | * | 12/2007 | F01P 11/0276 |
| WO | WO-2015143787 | A1 | * | 10/2015 | F04C 9/002 |
| WO | WO-2018148774 | A1 | * | 8/2018 | F02F 1/004 |

* cited by examiner

*Primary Examiner* — Joseph J Dallo
(74) *Attorney, Agent, or Firm* — Davidson Kappel LLC

(57) ABSTRACT

A crankcase of an internal combustion engine including an outer coolant jacket and a drain channel, which leads through an other wall of the crank case from the outside into the outer coolant jacket, further including a closure element which sits with a closure section in the drain channel and closes the drain channel, an outer coolant jacket, and a closure element, which sits with a closure section in the drain channel and closes the drain channel. An inner coolant jacket and a connecting channel, which connects the inner coolant jacket to the outer coolant jacket. The closure element has an extension section which is accommodated in the connecting channel and forms a gap-shaped passage with the latter.

12 Claims, 3 Drawing Sheets

CRANKCASE WITH INNER AND OUTER COOLANT JACKET

CROSS REFERENCE TO RELATED APPLICATION

This claims the benefit of a German Patent Application DE102023000401.4, filed on Feb. 9, 2023 which is hereby incorporated by reference herein.

TECHNICAL FIELD

The present disclosure relates to a crankcase of an internal combustion engine which comprises an outer coolant jacket, a drain channel which leads through an outer wall of the crankcase from the outside into the outer coolant jacket, and a closure element which sits with a closure section in the drain channel and closes it.

BACKGROUND

Such a crankcase is known, for instance, from EP 0 457 051 A1. EP 0 457 051 A1 shows a cylinder crankcase of a fluid-cooled reciprocating internal combustion engine with cylinders arranged in a V-shape and surrounded by cooling channels. In order to achieve more uniform cooling and to establish a favorable coolant drain on the flywheel-side end face of the cylinder crankcase, a transverse channel is provided which connects the cooling channels of the cylinder banks and which has a downwardly extending channel section through which the coolant can be drained. The channel section is bounded by a lower wall in which a downward-facing threaded hole is provided into which a drain plug is sealingly screwed.

DE 102 41 478 A1 shows a coolant channel of a motor vehicle with a coolant pump and a drain plug arranged in the area of a coolant channel. The drain plug is located inside a housing wall of the coolant pump. The drain plug has a coolant channel that can be connected to the coolant channel of a crankcase wall and communicates with the environment, so that coolant can be drained by loosening the drain plug without having to remove it completely.

SUMMARY

An object of the present disclosure is to provide a crankcase in which two separate coolant jackets can be drained by simple means.

An object is achieved by a crankcase of an internal combustion engine which comprises an outer coolant jacket, a drain channel which leads through an outer wall of the crankcase from the outside into the outer coolant jacket, and a closure element which sits with a closure section in the drain channel and closes it. The crankcase also has an inner coolant jacket and a connecting channel which connects the inner coolant jacket to the outer coolant jacket, wherein the closure element has an extension section which is accommodated in the connecting channel and forms a gap-shaped passage with the latter.

The one closure element thus closes the outer coolant jacket on the one hand and separates the outer coolant jacket from the inner coolant jacket except for the gap-shaped passage on the other hand. This means that only a single element, namely the closure element, is required to close both coolant jackets, i.e. the outer coolant jacket and the inner coolant jacket. To drain the two coolant jackets, only the one closure element needs to be removed. The coolant in the outer coolant jacket can then drain to the outside through the drain channel. The coolant in the inner coolant jacket first drains through the connecting channel into the outer coolant jacket and from there through the drain channel to the outside.

To avoid a static overdetermination of the closure element on the one hand in relation to the drain channel and on the other hand in relation to the connecting channel, it is provided that the extension section forms a gap-shaped passage with the connecting channel, so that manufacturing and assembly tolerances can be compensated by the gap-shaped passage. Direct contact between the closure element and the crankcase in the axial direction is avoided, resulting in different gap dimensions of the gap-shaped passage depending on manufacturing and assembly tolerances. Radial contact between the closure element and the connecting channel cannot be ruled out.

The extension section of the closure element protrudes through the outer coolant jacket and extends into the connecting channel with one end section. This means that only part of the extension section sits in the connecting channel. In addition, the extension section can also only extend into an initial section of the connecting channel without penetrating it completely.

In an embodiment, it may be provided that the connecting channel is arranged in an intermediate wall between the outer coolant jacket and the inner coolant jacket, with the intermediate wall being arranged on a side of the outer coolant jacket opposite the outer wall. The drain channel and the connecting channel can be arranged along a common longitudinal axis.

The extension section can form an annular gap with the connecting channel, which may be arranged coaxially to a longitudinal axis of the connecting channel. The extension section and the connecting channel may be cylindrical in shape. In this case, the outer diameter of the extension section is smaller than the inner diameter of the connecting channel, at least in the area where it enters the connecting channel. The gap-shaped passage is thus formed in the shape of an annular gap. However, it is also conceivable that the cross-sections of the extension section and the connecting channel have a contour that deviates from a circle.

The connecting channel can be divided into different sections. The connecting channel can have a receiving section in which the extension section of the closure element is received or extends. In the direction towards the inner coolant jacket, the receiving section can merge into a conduit section that has a smaller inner diameter than the receiving section.

An annular surface can be formed between the receiving section and the conduit section, with the extension section of the closure element forming an annular gap to the annular surface at the end face. The extension section may have an outer diameter that is larger than an inner diameter of the conduit section, at least in the area in which it enters the receiving section. In this case, the annular gap to the annular surface can have essentially the same gap width as an annular gap between the extension section and the connecting channel. This creates a labyrinth in which coolant flowing between the inner coolant jacket and the outer coolant jacket produces turbulence, which ensures an additional sealing function or pressure drop.

According to an exemplary embodiment, the drain channel has an internal thread into which the closure section of the closure element is screwed with a corresponding external thread. This makes it easy to attach the closure element to the crankcase.

The closure element may have a head section that protrudes outwardly from the drain channel, the head section having an outer diameter that is larger than an inner diameter of the drain channel.

To achieve a reliable sealing effect, a sealing element can be arranged between the head section of the closure element and the outer wall of the crankcase.

To ensure easy installation of the closure element, the extension section of the closure element can have a smaller outer diameter than the closure section of the closure element or than an inner diameter of the drain channel.

BRIEF SUMMARY OF THE DRAWINGS

An exemplary embodiment is explained in more detail below using the drawings.

DETAILED DESCRIPTION

Figure 1:
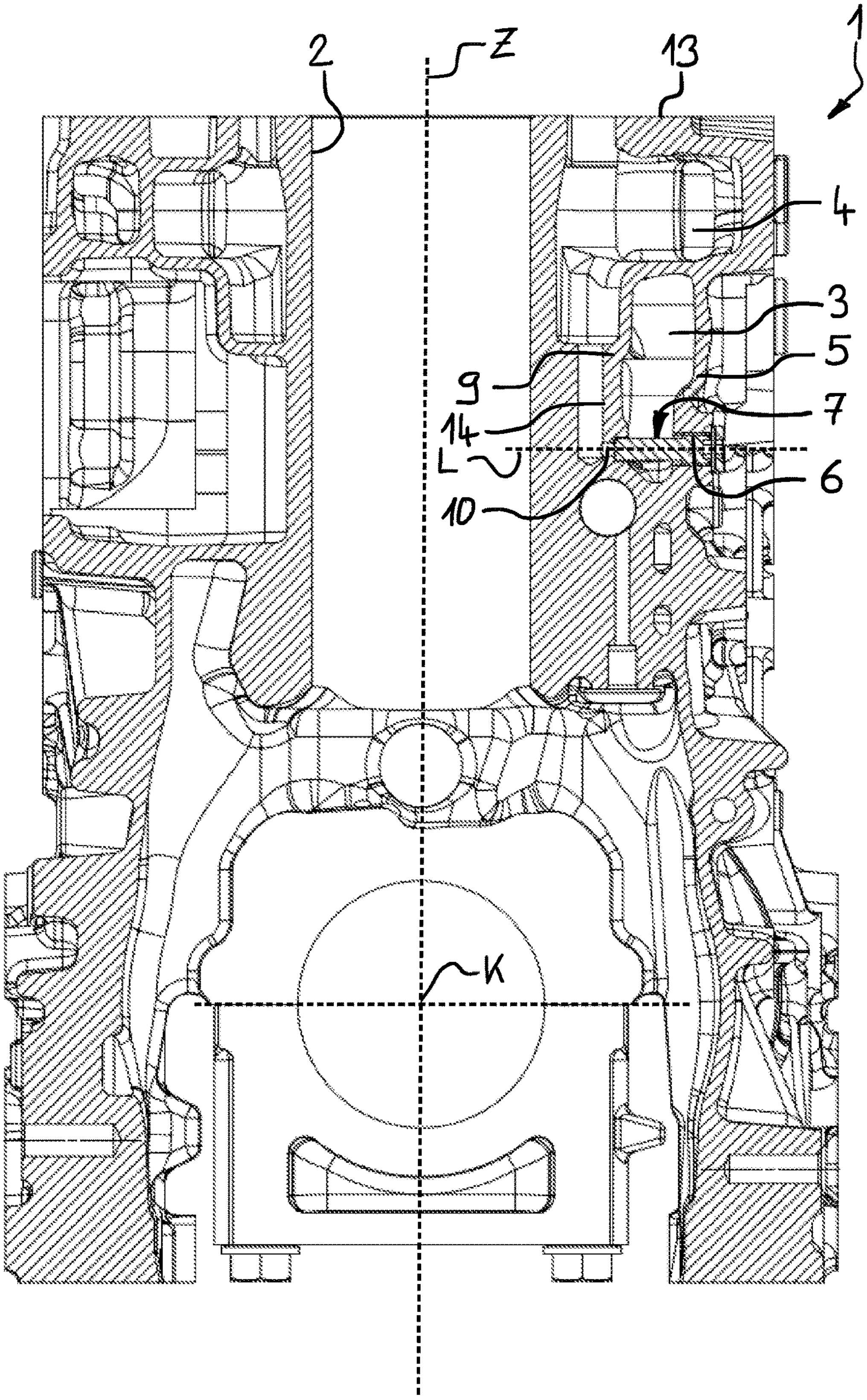
FIG. 1 shows a cross-section of a crankcase.
Figure 2:
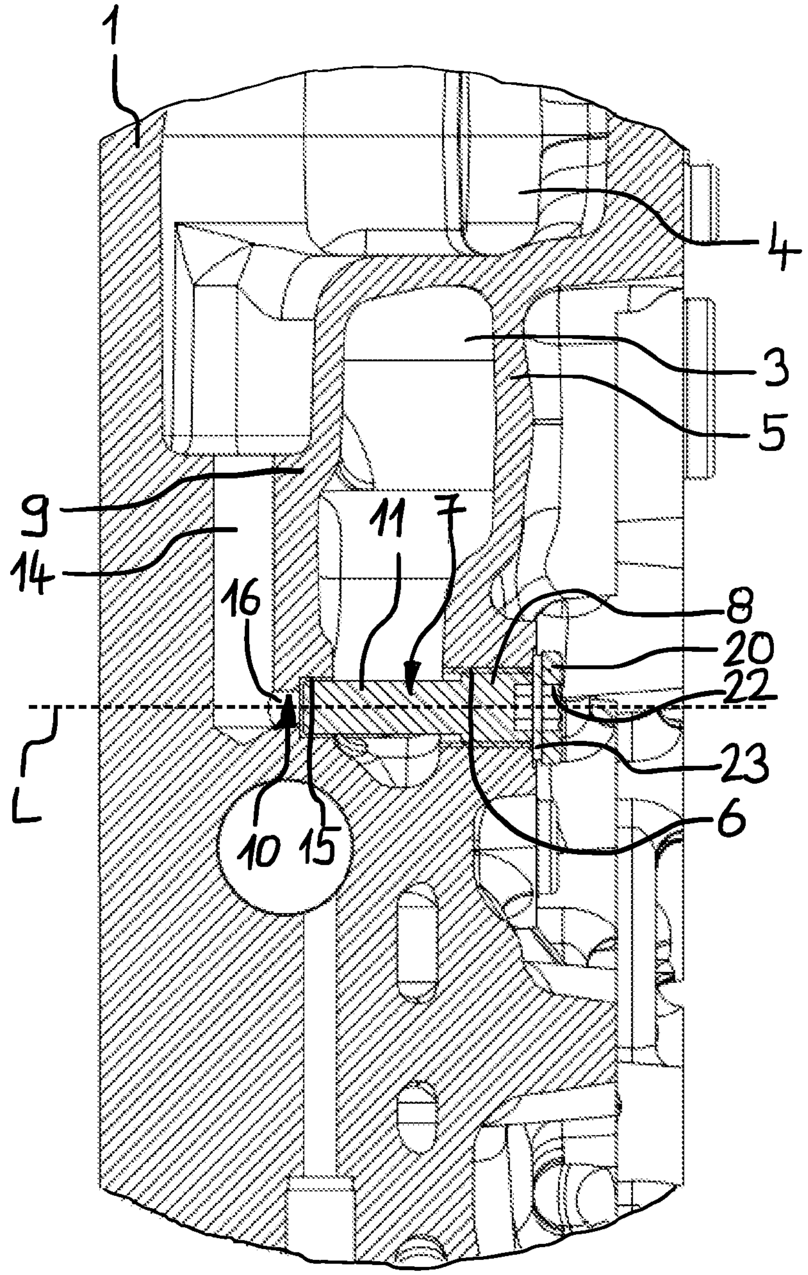
FIG. 2 shows an enlarged view of the cross-section of the crankcase according to FIG. 1 in the area of the inner coolant jacket and the outer coolant jacket.
Figure 3:
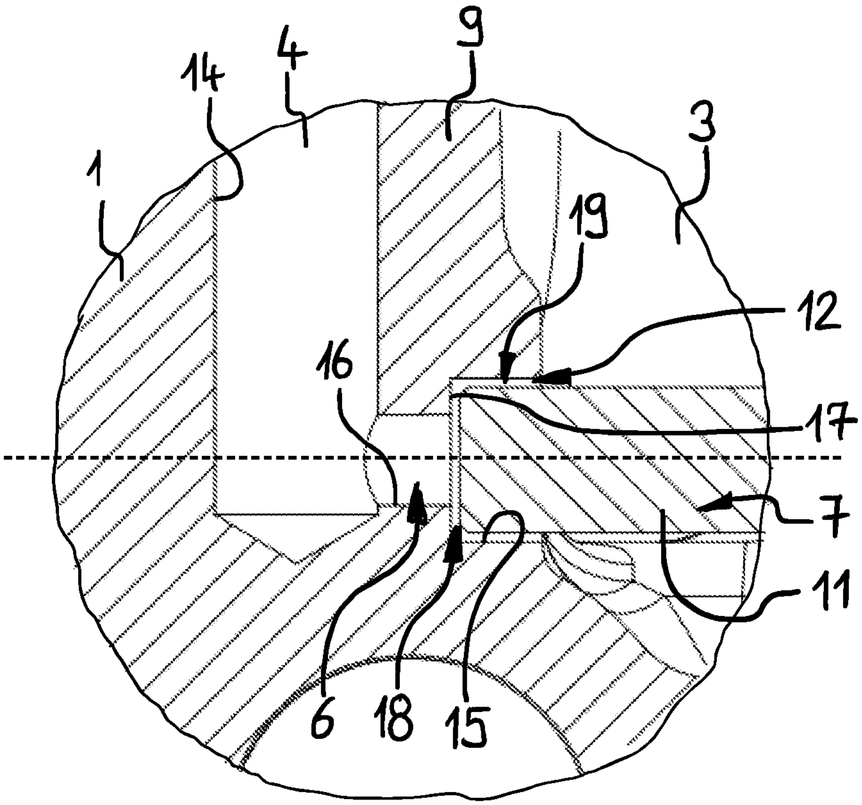
FIG. 3 shows an enlarged view of the cross-section of the crankcase according to FIG. 1 in the area of the connecting channel.

FIGS. 1 to 3 show different views of a crankcase 1 and are described together below.

FIG. 1 shows a cross-section through the crankcase 1 of an internal combustion engine with a cylinder bore 2 along a cylinder axis Z. Several cylinder bores 2 can be arranged one behind the other. The cylinder bore 2 serves to accommodate a piston, not shown here, for driving a crankshaft, also not shown, about a crankshaft axis K.

An outer coolant jacket 3 and an inner coolant jacket 4 are arranged in the crankcase 1 to cool the crankcase 1. The inner coolant jacket 4 is arranged closer to the cylinder axis Z than the outer coolant jacket 3.

A drain channel 6 is arranged in an outer wall 5 of the crankcase 1, which opens from the outside into the outer coolant jacket 3. A closure element 7 is located in the drain channel 6 to seal and close the drain channel 6. The closure element 7 has a closure section 8, which is accommodated in the drain channel 6. Coolant is contained in the outer coolant jacket 3 and can be drained from the outer coolant jacket 3 by removing the closure element 7 from the drain channel 6.

The outer coolant jacket 3 and the inner coolant jacket 4 are separated from each other by an intermediate wall 9. A connecting channel 10 is arranged in the intermediate wall 9, which fluidically connects the inner coolant jacket 4 with the outer coolant jacket 3. So that the outer coolant jacket 3 and the inner coolant jacket 4 are separated from each other in the operating state, the closure element 7 has an extension section 11, which extends into the connecting channel 10 and is partially accommodated therein and forms a gap-shaped passage 12 with the connecting channel 10. The gap-shaped passage 12 allows the coolant arranged in the inner coolant jacket 4 to be exchanged with the coolant contained in the outer coolant jacket 3. However, the gap-shaped passage 12 reduces this exchange of coolant to a minimum, which is negligible compared to the coolant flows within the inner coolant jacket 4 and the outer coolant jacket 3. This keeps the coolant jackets 3, 4 separate from each other. The passage 12 also prevents the closure element 7 from being statically overdetermined in relation to the drain channel 6 on the one hand and the connecting channel 10 on the other hand. The gap-shaped passage 12 makes it possible to compensate for manufacturing and assembly tolerances.

On a side of the inner coolant jacket 4 facing away from a flame deck 13, into which the cylinder bore 2 opens, the jacket has a bore section 14, from which the connecting channel 10 extends.

The connecting channel 10 has a receiving section 15 facing the closure element 7, in which an end section of the extension section 11 of the closure element 7 is received or extends.

The receiving section 15 of the connecting channel 10 merges in the direction towards the inner coolant jacket 4 into a conduit section 16, which has a smaller internal diameter than the receiving section 15.

In the exemplary embodiment shown, an annular ring-shaped surface 17 is formed between the receiving section 15 and the conduit section 16, which is arranged in a plane transverse to a longitudinal axis L of the connecting channel 10.

The extension section 11 has an outer diameter that is larger than the inner diameter of the conduit section 16. In addition, the closure element 7 is not fully inserted into the receiving section 15, so that between the extension section 11 of the closure element 7 and the annular surface 17 a first annular gap section 18 of the passage 12 is formed, which is circular in shape. This is adjoined by a cylindrical second annular gap section 19 between the extension section 11 of the closure element 7 and an inner wall of the receiving section 15 of the connecting channel 10, which opens into the outer coolant jacket 3. This results in a type of labyrinth seal in which the coolant flowing from the inner coolant jacket 4 to the outer coolant jacket 3, for example, is deflected twice by 90°. This results in turbulence in the flow of the coolant, which ensures an additional sealing function in order to keep the volume flow that is exchanged between the inner coolant jacket 4 and the outer coolant jacket 3 as low as possible.

The closure element 7 has a head section 20 that protrudes from the outside of the drain channel 6. The head section 20 has an outer diameter that is larger than an inner diameter of the drain channel 6 and thus forms a collar projecting from the closure section 8 of the closure element 7. A sealing element 21 is arranged between the head section 20 of the closure element 7 and the outer wall 5 of the crankcase 1, whereby the outer coolant jacket 3 is sealed off to the outside. To remove the closure element 7 from the drain channel 6, it has an internal hexagon 22 as an engagement means for a tool.

LIST OF REFERENCE SIGNS

1 Crankcase
2 Cylinder bore
3 Outer coolant jacket
4 Inner coolant jacket
5 Outer wall
6 Drain channel
7 Closure element
8 Closure section
9 Intermediate wall
10 Connecting channel
11 Extension section
12 Passage
13 Flame deck
14 Bore section
15 Receiving section
16 Conduit section

17 Annular surface
18 First annular gap section
19 Second annular gap section
20 Header section
21 Sealing element
22 Internal hexagon
K Crankshaft axis
L Longitudinal axis
Z Cylinder axis

What is claimed is:

1. A crankcase of an internal combustion engine comprising:

an outer coolant jacket;

a drain channel leading through an outer wall of the crankcase from an outside into the outer coolant jacket; and a closure element sitting with a closure section in the drain channel and closing the drain channel;

an inner coolant jacket; and a connecting channel connecting the inner coolant jacket to the outer coolant jacket;

the closure element having an extension section accommodated in the connecting channel and forming a gap-shaped passage with the connecting channel.

2. The crankcase according to claim 1, wherein the connecting channel is arranged in an intermediate wall between the outer coolant jacket and the inner coolant jacket, the intermediate wall being arranged on a side of the outer coolant jacket opposite the outer wall.

3. The crankcase according to claim 1, wherein the extension section forms an annular gap with the connecting channel.

4. The crankcase according to claim 1, wherein the connecting channel has a receiving section in which the extension section is received.

5. The crankcase according to claim 4, wherein the receiving section merges in a direction towards the inner coolant jacket into a conduit section, wherein the conduit section has a smaller internal diameter than the receiving section.

6. The crankcase according to claim 5, wherein an annular surface is formed between the receiving section and the conduit section.

7. The crankcase according to claim 6, wherein the extension section has an outer diameter that is larger than an inner diameter of the conduit section.

8. The crankcase according to claim 5, wherein the extension section has an outer diameter that is larger than an inner diameter of the conduit section.

9. The crankcase according to claim 1, wherein the drain channel has an internal thread into which the closure section of the closure element is screwed with a corresponding external thread.

10. The crankcase according to claim 1, wherein the closure element has a head section which projects outwards from the drain channel, wherein the head section has an outer diameter that is larger than an inner diameter of the drain channel.

11. The crankcase according to claim 10, wherein a sealing element is arranged between the head section of the closure element and the outer wall of the crankcase.

12. The crankcase according to claim 1, wherein the extension section of the closure element has a smaller outer diameter than the closure section of the closure element.

* * * * *